Patented Nov. 7, 1939

2,178,537

UNITED STATES PATENT OFFICE 2,178,537

MOLDING

Herbert A. Endres, Silver Lake, Ohio, assignor to Wingfoot Corporation, Wilmington, Del., a corporation of Delaware No Drawing. Application August 22, 1936, Serial No. 97,442

2 Claims. (Cl. 18—55)

This invention relates to the molding of condensation derivatives of rubber. More particularly it relates to the molding of a substantially unoxidized product such as is obtained by the commercial preparation of condensation derivatives under non-oxidizing conditions, i. e., by a process in which oxygen is substantially excluded.

Fisher U. S. 1,605,180 discloses the molding of condensation derivatives of rubber and the art comprises other references to molding such compounds. However, there has been no suggestion that improved results are obtained by molding substantially unoxidized products. No prior art suggestion has met with success although attempts have been made to commercialize the molding of such products.

I have found that if the condensation derivative of rubber is prepared under non-oxidizing conditions the resulting product is suitable for commercial molding whereas the oxidized product is unsuitable for such use, particularly because of the difficulty resulting from adherence of the oxidized material to the mold, whether the mold be of steel, brass, aluminum, chromium plated, etc. In using the unoxidized material it may be desirable to use a mold lubricant as is customary in certain other commercial molding operations and for this purpose carnauba wax or the like may be employed.

The unoxidized molding material is advantageously prepared by treating a rubber cement with chlorostannic acid or a halide of an amphoteric element or a mixture of hydrochloric acid and the halide of an amphoteric element or other condensing agent. Such halides as tin tetrachloride, boron fluoride, chromic chloride and the like may be employed. It is advantageous to use the derivative in a state in which it is substantially free from water soluble impurities and to obtain the product in this form the reacted rubber cement is advantageously poured into a large volume of water to form an emulsion in which the water constitutes the continuous phase. This dissolves the water-soluble materials out of the organic solution and by subjecting the emulsion to steam distillation the molding material may be obtained in a condition free from such materials.

It has previously been suggested that condensation derivatives of rubber be prepared by acting on solid rubber with various condensing agents which are milled into the rubber on a rubber mill with subsequent heating of the milled mass in an oven. Such heating effects oxidation which causes the molding material to stick to the mold. If the rubber mass is heated in the absence of oxygen, i. e., either in a vacuum or in an atmosphere of nitrogen or other inert gas the product is obtained in a substantially unoxidized condition and may be molded on a commercial scale without undue adherence of the molding material to the mold. The product thus obtained is not free from water-soluble impurities. By removing the water-soluble impurities as by forming a water emulsion of the reaction product of a rubber cement and the condensing agent and precipitating the final product out of the emulsion an improved, purer product is produced.

I prefer to carry out the reaction by allowing the condensing agent to act on a rubber cement because it appears that in such an operation the reaction may be more easily controlled. The softening point of the molding material may be varied by regulating the extent to which the condensing agent acts on the rubber. A harder product is obtained by continuing the condensation reaction for a longer time than when a product of lower softening point is produced. The softening point of the final product is advantageously controlled by sampling the reacted cement from time to time, determining the viscosity of the samples and stopping the reaction when a cement of known rubber content has been converted to a reacted cement of predetermined viscosity.

One method of procedure involves preparing a rubber cement by dissolving in benzene ten percent (based on the weight of the benzene) of pale crepe rubber which has been plasticized by known means to a condition such that a $\frac{9}{16}$ cubic inch sample thereof when compressed on a flat plate beneath a flat 10 kg. weight for 3½ minutes in a cabinet heated to a temperature of 70° C. is flattened out to a thickness slightly less than ⅛ inch. This corresponds to a plasticity figure in the neighborhood of 300 as determined by the Williams plastometer, an instrument used extensively in the art. Although unvulcanized rubber of any plasticity value may be employed and although it is recognized that rubber having a certain plasticity figure gives a condensation derivative better adapted to some uses than to others, it has been found that rubber prepared as described above is generally satisfactory.

Approximately 350 gallons of the cement is then placed in a steam jacketed Day mixer equipped with a reflux condenser or similar apparatus, whereupon approximately 10% of hydrated chlorostannic acid ($H_2SnCl_6 \cdot 6H_2O$) based on the weight of the rubber in the cement is added. The chlorostannic acid may be conveniently prepared by adding sufficient aqueous hydrochloric acid to tin tetrachloride to provide water for the hydrate and then saturating with hydrogen chloride gas at room temperature. The mixture is heated and then agitated for a period of three hours at temperatures preferably between 65–80° C., but in any event near the boiling point of the particular solvent used. Samples should be taken every few minutes and the viscosities thereof determined by suitable means. Usually the desired viscosity is obtained after a reaction period of about six hours, although this figure varies somewhat from batch to batch.

Any viscosity instrument may be used for testing the reacted cement, one such being a Gardner Mobilometer, an instrument measuring the viscosity of a sample in terms of the time in minutes required for a plunger of known weight and area to fall a known distance in a cylinder of known volume containing the test sample. The clearance between the plunger and the wall of the cylinder is also known. It is preferable to take all readings at one temperature, 25° C. being selected as suitable in the examples herein described. The mobilometer used had the following dimensions:

| | | |
|---|---|---|
| Thickness of plunger disc | inches | 0.066 |
| Diameter of plunger disc | do | 1.502 |
| Diameter of plunger shaft | do | 0.248 |
| Inside diameter of cylinder containing test sample | do | 1.535 |
| Height of cylinder | do | 9.0 |
| Length of plunger shaft | do | 20.0 |
| Distance between the two marks on plunger shaft | do | 7.484 |
| Total weight of shaft, top weight and disc | grams | 68.6 |

When the viscosity of the cement reaches a point about .05 to .07 minute above the desired final viscosity, generally in the range of 0.20±.10 minute sodium hydroxide or water or the like is added to stop the reaction. For this purpose one may add 40 grams of sodium hydroxide, dissolved in water, per pound of chlorostannic acid used in the reaction or one pint of water per pound of chlorostannic acid used. The batch is then cooled and filtered, after which the reacted cement in the ratio of 350 gallons of cement to 450 gallons of water is discharged into water at ordinary room temperature and agitated by an impeller rotating at approximately 240 R. P. M. It will be found desirable to add a reducing agent to the water, e. g. ¾ of an ounce of sodium sulfite per gallon of water, prior to the addition of the reacted cement for the purpose of preventing oxidation of the product.

Thereupon steam is introduced into the water-cement mixture at such a rate that the vapor temperature in an ordinary column extending from the reactor to a condenser reaches 154° F. in 40 minutes. During the next thirty minutes the temperature is maintained at 154° F. during which interval the majority of the solvent distills over into a condenser. The temperature is then increased to 210° F. in the next 50 minutes and permitted to remain there for another five minutes, during which practically all of the remainder of the solvent distills off. The chlorostannic acid conversion product of rubber precipitates in a finely divided, sand-like form and may then be centrifuged, washed with water and dried in a vacuum oven. It is a chlorine-containing condensation derivative of rubber.

In another instance 25 pounds of rubber-chlorostannic acid cement reacted as above was discharged into 28 gallons of water agitated by an impeller or other suitable means. The container was closed and steam was introduced at such a rate that the temperature of the mass reached 150° F. in ten minutes. During the next ten minutes the temperature was raised to 160° F. and in five minutes more to 200–210° F. where it was permitted to remain for five miutes. The rubber conversion product precipitated in a finely divided, sand-like form which could be washed conveniently.

If a somewhat coarser product is desired, it may be easily obtained by increasing the rate of distillation. In one case, a 25-pound batch of reacted cement in 28 gallons of water was heated at such a rate that the temperature rose to 145° in 10 minutes. This was followed by a short period of heating at 200–210°. The product precipitated in a size approximating that of small pebbles.

The oxygen content of a product produced in this manner is extremely low. A product of similarly low oxygen content may be obtained with other condensing agents. Chlorostannic acid and tin tetrachloride and boron fluoride appear to be the most satisfactory reagents.

It is to be understood that many variations may be made in the steps of the process. As a general rule, it may be said that the longer the reaction of the materials, the harder and more brittle the conversion product will be. Similarly, the longer the reaction, the less the viscosity of the reacted cement. However, the same viscosity figure for different batches of reacted cement employing rubber of different plasticities may not give a conversion product reacted to the same degree inasmuch as a rubber cement employing well-plasticized rubber is somewhat less viscous than one containing rubber which has been plasticized only slightly. In most instances, it will be necessary to determine the standards for the final product desired according to the rubber employed.

Similarly, the particle size of the final product may be varied somewhat according to the conditions of handling during the discharging operation. One condition affecting particle size is the ratio, during discharging, of water to reacted cement, it being found that the less the water, the larger the particle size. Another is the ratio of agitation of the mass; in general, the less the agitation, the larger the particle size. Also, the faster the distillation of the solvent, the larger will be the particle size.

In the process disclosed herein a cement which has been reacted to a viscosity of approximately 0.35 minute gives a conversion product softening in the neighborhood of 50° C. Similarly, a reacted cement viscosity of 0.30 minute gives a conversion product softening around 70° and one of 0.20 minute gives a product softening at approximately 90° C. and one of 0.10 minute, 140° C. Generally, it will not be desirable to react the materials to a point much below 0.10 minute, because of the relative brittleness of the final product.

A conversion product precipitated in powder form in accordance with the above described methods, is more or less porous, and is advantageously subjected to a milling operation to form a relatively solid mass, or sheet which may subsequently be ground to suitable particle size for use as a molding powder. In the massive state, for example, as obtained by working on the ordinary rubber mill the conversion products are susceptible to only very superficial oxidation. The sheet or massive material when ground to a powder suitable for molding is generally sufficiently resistant to surface oxidation by ordinary handling in contact with air (or storage in paper bags) that from a week to sometimes a month may elapse before sufficient surface oxidation has taken place to cause serious sticking to the molds. However, it is recommended that molding operations be conducted as soon after grinding as feasible. By remilling a surface-oxidized powder and again grinding to powder form the product can then be satisfactorily molded. This recovery operation may ordinarily be repeated indefinitely.

The condensation derivative prepared as above described is transparent, and in the form of films, practically colorless. It is light in weight, having a specific gravity of 1.05. Being essentially neutral, it is compatible with all pigments and dyes and in this respect differs materially from many materials on the market. It has a very high resistance to discoloration on being exposed to light, a sample having been exposed to the elements for a period of six months showing only a slight loss of surface lustre. Its moisture absorption after being immersed in water for 24 hours is only 0.20%.

The conversion product is also resistant to strong alkalis and to most acids except concentrated nitric and sulphuric acids. It is insoluble in acetone and alcohols. It has a low inflammability, burning only with a very low flame. Having a tensile strength of approximately 400–500 lbs./sq. in. and a transverse strength of 700–900 lgs./sq. in., its physical strength is entirely satisfactory for most purposes. The surface resistivity is approximately $10^{12}$ ohms per linear inch after subjection to an atmosphere of 90% relative humidity for a considerable period. Still further, the conversion product, by certain surface treatments to be hereinafter described, may be made substantially resistant to oils.

The improved conversion product of this invention is thermoplastic and molds readily at temperatures in the neighborhood of from 200° F. to 300° F. and higher and pressures of 1000 lbs. per sq. in. or more. The maintenance of close pressure and temperature limits is not essential, as it is in the case of some molding resins, as there is no danger from under or over curing and, with reasonable precautions, none from burning or discoloration. The product flows easily under heat and pressure, rendering it capable of use in all shapes of molds. Being thermoplastic, any overflow which may result may be remolded. In the powder form in which it is obtained after precipitating and drying, it has a bulk factor of around 8.5 to 1; but when mixed with other ingredients, as hereinafter described, the bulk factor is usually about 2.5 to 1.

As with other thermoplastic materials, the molding cycle duration varies with several factors, such as the thickness of the molded section, the steam pressure and temperature of the mold, and the type of channeling of the mold. With an average piece, full pressure can be applied and the mold completely closed within about 15 seconds after the charge is in the heated mold. As soon as the mold is fully closed, the steam can be shut off and cold water admitted to the mold channels. Then as soon as the mold temperature has fallen to about 150° F. the piece may be removed without danger of warpage or distortion.

Pieces such as an ordinary salad plate, having an average section thickness of approximately 1/8 inch, have been molded readily on a 4½ minute cycle. Section thicknesses varying from 0.025 inch to 1.25 inches have been molded without difficulty. Inserts, also, may be used without the troubles from cracking that are sometimes found when employing other artificial resins. Pieces molded with thin sections have a degree of flexibility comparable with that attained with cellulose acetate and Celluloid materials and possess the so-called "unbreakable characteristics" so often mentioned in referring to dishes formed from formaldehyde-urea plastics.

In general, any of the familiar types of molds such as flash, semi-positive and positive molds may be used. As the conversion product is substantially inert, the same mold equipment that is employed for phenolic and other plastics may be used without corrosive action. The products may be formed more easily smooth-surfaced molds than in those having irregular surfaces, although no unusual difficulties are encountered. With the softer forms of the conversion product there may be a tendency to stick to the mold surface, but this may be overcome by the use as a mold lubricant of carnauba wax or the like.

These excellent characteristics make possible a number of desirable uses for the composition. Thus the composition itself may be molded into transparent objects of a light amber color or it may be mixed with substantially any filler, pigment, dye or other ingredient to give a moldable composition of particularly pleasing colorations. Illustrative of molding compositions which have been found unusually satisfactory are the following:

*Formula 1*

| | Parts by weight |
|---|---|
| Rubber conversion product (viscosity 0.25 min.) | 100 |
| Wood flour | 40 |
| Carbon black | 10 |

*Formula 2*

| | Parts by weight |
|---|---|
| Rubber conversion product (.20 viscosity) | 100 |
| Titanium oxide | 25 |
| Whiting | 40 |
| Green dye | 1 |

*Formula 3*

| | Parts by weight |
|---|---|
| Rubber conversion product (.17 viscosity) | 100 |
| Titanium oxide | 5 |
| Blue dye | 1 |

*Formula 4*

| | Parts by weight |
|---|---|
| Rubber conversion product (.20 viscosity) | 100 |
| Titanium oxide | 0.10 |
| Soluble red dye | 0.10 |

*Formula 5*

| | Parts by weight |
|---|---|
| Rubber conversion product (.20 viscosity) | 100 |
| Soluble red dye | 0.10 |

The green and blue dyes employed were, respectively, Green X688 and Blue #1118, both furnished by the Imperial Color Company and both insoluble in the conversion product. Fillers, such as paper, asbestos or fabric may be used and the range of pigments is practically unlimited.

These formulae are simply illustrative of the broad scope of the invention, any other ingredients in any reasonable proportions being capable of employment. Thus Formula 1 has been found to be very useful in molding serving trays and the like. The molded composition of Formula 2 is opaque, and light green in color and has been employed in household appliances such as are used with electric mixers. Formula 3 gives a blue composition adapted for salad plates and the like.

Unlike the molded compositions of Formulas 1, 2 and 3, that of Formula 4 is obtained in a smoky or iridescent, translucent shade and, in view of this fact, is very desirable for use in many molded decorative articles. The titanium oxide or other pigment in such small amounts, gives the smoky effect. It is probable that if as much as 0.50 part of pigment per 100 parts by weight of conversion product are employed, the composition will lose its smoky appearance and become opaque.

Any dye which is soluble in the conversion product may be employed, the entire class of oil soluble dyes being generally satisfactory. Without the addition of pigment, the molded composition is transparent and of the color of the dye used. Such compositions are also useful in molding various articles.

In preparing these compositions, one method found to be quite efficient is that of placing enough of the conversion product on mill rollers to form a narrow band on one of the rollers and then incorporating, in admixture, the remaining conversion product and ingredients. Another is to mix the pigments and conversion product in powder form, place them on mill rollers and mix into sheet form, following which the fillers, dyes and other ingredients are incorporated. Also, if desired, the various ingredients may be added in the form of sheeted or granular conversion product in which dye or other ingredient has been previously mixed.

It will be found that in general a mixing time of approximately 20 minutes will be required to thoroughly incorporate and uniformly mix the ingredients in the conversion product. At the start of the mixing operation, it is desirable that the mill rollers be fairly warm, i. e., at a temperature, for example, of 180° F. During the operation the mixing temperature will usually increase to from 200° to 300° F. depending upon the type of conversion product employed. Compositions made up of a conversion product having a viscosity in the lower ranges generally give off more heat than those containing the higher viscosity conversion products.

During the period of mixing the composition receives a high charge of static electricity, making it desirable to carry out the mixing in as clean a room as possible in order to prevent the adhesion of dirt particles to the molding composition. Consequently, after the ingredients have been thoroughly incorporated in the conversion product, the composition is preferably sheeted out and allowed to cool in covered racks or the like to prevent dirt particles from adhering to the composition. Since it is desirable to employ the molding composition in the form of a powder in nearly all molding operations, the sheeted composition is ordinarily then ground to a powder. It will be found desirable to carry out this step in a grinder which generates very little heat, such for example, as an Abbe grinder, in order to prevent the composition from sticking to the grinder.

The molded products are advantageously dipped in chlorine water after molding to prevent the surfaces from being tacky and to make them more oil and grease resistant. The molded products are thermoplastic and substantially resistant to deterioration under the influence of sunlight, which latter property is particularly valuable. They are, moreover, resistant to strong alkalis and most acids except in concentrated form. They have excellent adhesion qualities and a very low water absorption, further, they have a high physical strength and although the softening point can be controlled by regulating the condensation reaction, they do not soften at a temperature below 50° C., and generally above 70° C.

Although in the specific example the method of preparing these products involves the use of chlorostannic acid, they may be similarly prepared by treating rubber cement with a mixture of hydrochloric acid and the halide of an amphoteric metal. In such reactions it is advantageous to boil the rubber cement with the hydrochloric acid before adding the metallic halide. Other condensing agents may be employed.

This application is in part a continuation of application Serial No. 740,300 filed August 17, 1934 which is in part a continuation of application Serial No. 655,678, filed February 7, 1933.

I claim:

1. That improved method of molding condensation derivatives of rubber which comprises forming with heat and pressure in a mold a substantially unoxidized condensation derivative of rubber obtained by decomposing with water the reaction product of chlorostannic acid and a rubber cement.

2. In a method of shaping condensation derivatives of rubber in a mold with heat and under pressure, the improvement which comprises bringing the rubber derivative into contact with the mold while the rubber derivative is in a substantially unoxidized state whereby molding is effected without undue adherence of the rubber derivative to the mold.

HERBERT A. ENDRES.

CERTIFICATE OF CORRECTION.

Patent No. 2,178,537.　　　　　　　　　　　　　　November 7, 1939.

HERBERT A. ENDRES.

It is hereby certified that error appears in the printed specification of the above numbered patent requiring correction as follows: Page 2, second column, line 13, for "miutes" read minutes; page 3, first column, line 34, for "0.20%" read 0.02%; line 42, for "lgs." read lbs.; and second column, line 26, after the word "easily" insert in; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.